US008198261B2

(12) United States Patent
Damien et al.

(10) Patent No.: US 8,198,261 B2
(45) Date of Patent: Jun. 12, 2012

(54) THERMALLY MODIFIED MICROBIAL-DERIVED CELLULOSE FOR IN VIVO IMPLANTATION

(75) Inventors: Christopher James Damien, Newtown, PA (US); Gerry Ann Oster, Langhorne, PA (US); Heather Ann Beam, Penndel, PA (US)

(73) Assignee: Xylos Corporation, Langhorne, PA (US)

( * ) Notice: Subject to any disclaimer, the term of this patent is extended or adjusted under 35 U.S.C. 154(b) by 837 days.

(21) Appl. No.: 10/920,297

(22) Filed: Aug. 18, 2004

(65) Prior Publication Data

US 2005/0042250 A1    Feb. 24, 2005

Related U.S. Application Data

(60) Provisional application No. 60/497,064, filed on Aug. 22, 2003.

(51) Int. Cl.
*A61K 31/715* (2006.01)
*A61F 2/00* (2006.01)
*C08B 1/00* (2006.01)

(52) U.S. Cl. .......... 514/57; 523/113; 523/114; 424/425; 536/56; 536/124

(58) Field of Classification Search .................... 514/57; 536/56; 523/113, 114; 424/425
See application file for complete search history.

(56) References Cited

U.S. PATENT DOCUMENTS

| 3,872,862 A | 3/1975 | Hume |
| 4,474,949 A | 10/1984 | Chatterjee et al. |
| 4,655,756 A | 4/1987 | Fawkes |
| 5,772,646 A * | 6/1998 | Blaney et al. ............. 604/367 |
| 5,942,218 A | 8/1999 | Kirschner et al. |
| 6,274,652 B1 * | 8/2001 | Uryu et al. ............. 524/27 |
| 6,320,093 B1 | 11/2001 | Augustine et al. |
| 6,369,289 B1 | 4/2002 | Orr, III |
| 6,599,518 B2 * | 7/2003 | Oster et al. ............. 424/425 |
| 7,374,775 B2 | 5/2008 | Damien et al. |

FOREIGN PATENT DOCUMENTS

| EP | 0 396 344 A2 | 11/1990 |
| JP | 03-000069 A | 1/1991 |
| JP | 03-157402 A | 7/1991 |

OTHER PUBLICATIONS

Supplementary European Search Report dated Apr. 26, 2011, in corresponding EP Appln. No. 04781944.6, 3 pages.
Office Action mailed Nov. 9, 2010, in corresponding Japanese Application No. 2006-524115, 3 page English translation.
Brown-Etris et al., "Evaluation of a Biosynthetic Material: A New Wound Dressing Concept," Abstract, 1 Sheet, presented as a poster around Apr. 1998.
"Some of These Companies Forecast Revenues of More Than $25 Million," May/Jun. 1999, 1 Sheet.
Redacted agreement, Exhibit A to Rule 132 Declaration of Russell Hoon, dated Sep. 12, 2005.
Jun. 22, 1998 510(k) approval No. K974251 for X-Cell Wound Dressing (printed out from FDA web site).

* cited by examiner

*Primary Examiner* — Shaojia Anna Jiang
*Assistant Examiner* — Everett White
(74) *Attorney, Agent, or Firm* — Foley & Lardner LLP

(57) ABSTRACT

A thermally modified microbial-derived cellulose material is described for use as an implantable material in general surgery, plastic surgery and neurosurgery.

6 Claims, 6 Drawing Sheets

THERMALLY MODIFIED MICROBIAL-DERIVED CELLULOSE FOR IN VIVO IMPLANTATION

This application claims the benefit of U.S. Provisional Application No. 60/497,064 filed Aug. 22, 2003, the contents of which are incorporated by reference herein.

FIELD OF THE INVENTION

This invention relates to polysaccharide materials and more particularly to microbial derived cellulose having suitable implantation properties for medical and surgical applications. The invention also relates to use of the microbial derived cellulose as tissue repair materials, human tissue substitutes and implants for plastic and reconstructive surgery and neurosurgery.

BACKGROUND OF THE INVENTION

The widespread use of synthetic materials as implantable devices in the medical industry has been well documented. These implantable synthetic materials can generally be divided into two major groups, temporary/bioresorbable and long-term implants/non-bioresorbable. Examples of bioresorbable synthetic materials include polymers comprising poly 1-lactic acid (PLLA) and poly 1-glycolic acid (PLGA), which have long been used as surgical sutures. These materials have been fabricated into films, meshes and more complex three-dimensional structures depending on intended applications as described in U.S. Pat. No. 6,031,148.

An example of long-term implantable and non-bioresorbable materials is poly(tetrafluoroethylene) PTFE, which has been used in a wide array of medical implantable articles including vascular grafts (U.S. Pat. No. 5,718,973), tissue repair sheets and patches (U.S. Pat. No. 5,433,996). Polymeric hydrogels have also been adapted for surgical implants (U.S. Pat. No. 4,836,884); finding uses such as soft tissue and blood vessel substitutes.

Each of these materials possesses certain physical characteristics that make them suitable as implant materials. Such properties include good biocompatibility, strength, chemical stability, etc. which can be particularly important for a specific application. For example, PTFE has the strength and interconnecting fibril structure that is critical in fabrication of tubular grafts. Synthetic hydrogels, which have a superficial resemblance to living tissue due to high water content, display minimal irritation to surrounding tissues making them ideal as prosthetic devices. However, these synthetic materials also have limitations and disadvantages including a limited range of physical and biochemical properties. Thus, there remains a need to explore alternative materials more suitable for specific surgical applications.

The use of viscose or regenerated cellulose as implantable articles is known. Several investigators have studied tissue biocompatibility of cellulose and its derivatives (Miyamoto, T. et al., *Tissue Biocompatibility of Cellulose and its derivatives. J. Biomed. Mat. Res.*, V. 23, 125-133 (1989)) as well as examined some specific applications for the material. The oxidized form of regenerated cellulose has long been used as a hemostatic agent and adhesion barrier (Dimitrijevich, S. D., et al. *In vivo Degradation of Oxidized regenerated Cellulose. Carbohydrate Research*, V. 198, 331-341 (1990), Dimitrijevich, S. D., et al. *Biodegradation of Oxidized regenerated Cellulose Carbohydrate Research*, V. 195, 247-256 (1990)) and are known to degrade much faster than the non-oxidized counterpart. A cellulose sponge studied by Martson, et al., showed biocompatibility with bone and connective tissue formation when implanted subcutaneously (Martson, M., et al., *Is Cellulose sponge degradable or stable as an implantation material? An in vivo subcutaneous study in rat. Biomaterials*, V. 20, 1989-1995 (1999), Martson, M., et al., *Connective Tissue formation in Subcutaneous Cellulose sponge implants in rats. Eur. Surg. Res.*, V. 30, 419-425 (1998), Martson, M., et al., *Biocompatibility of Cellulose Sponge with Bone. Eur. Surg. Res.*, V. 30, 426-432 (1998)): The authors summarized that the cellulose material can be a viable long-term stable implant. Other forms and derivatives of cellulose have also been investigated (Pajulo, O. et al. *Viscose cellulose Sponge as an Implantable matrix: Changes in the structure increase production of granulation tissue. J. Biomed. Mat. Res.*, V. 32, 439-446 (1996).

However, the prior art fails to mention the possible use of a unique form of cellulose produced by certain unicellular organisms. In this regard, microbial cellulose produced by certain microorganisms has been known and studied for characteristics not found in plant cellulose, including high water content similar to hydrogels and exceptional strength like PTFE. Microbial cellulose can be synthesized in various shapes or sizes, and has excellent shape retention. These properties are mostly attributed to its unique laminar microfibrillar three-dimensional structure. The microfibrils arranged in a nonwoven manner are about 200 times finer than plant cellulose such as cotton fibers, yielding tremendous surface area per unit volume.

Even with the multitude of novel properties, microbial cellulose has not been fully utilized, and thus, limited applications have been suggested. For example, the use of microbial derived cellulose in the medical industry has been limited to liquid loaded pads (U.S. Pat. No. 4,788,146), wound dressings (U.S. Pat. No. 5,846,213) and other topical applications (U.S. Pat. No. 4,912,049). Mello et al., (Mello, L. R., et al., *Duraplasty with Biosynthetic Cellulose: An Experimental Study. Journal of Neurosurgery*, V. 86, 143-150 (1997)) published the use of biosynthetic cellulose similar to the one described in (U.S. Pat. No. 4,912,049) as a duraplasty material in an experimental animal study. Their results showed that the dried form of the microbial derived cellulose was adequate as a dural substitute. However, the material described by Mello et al. does not undergo a depyrogenation step and the material is fully dried while being stretched as described in U.S. Pat. No. 4,912,049 (BIOFILL™ Wound Dressing) that was originally developed for topical applications. In contrast, the instant invention provides a non-pyrogenic implantable material and uses a thermal dehydration method to partially dehydrate the surgical mesh. This endows the invention with superior conformability and absorption properties not available in previously described cellulosic materials.

In another aspect of the invention, various methods have been described in drying microbial cellulose. Blaney et al. in U.S. Pat. Nos. 5,580,348 and 5,772,646 describe an absorbent material which comprises a microbial polysaccharide having a mean pore size of about 0.1 to about 10 microns. The absorbent material is prepared by a process that comprises supercritical carbon dioxide drying of a microbial polysaccharide to remove the majority of the aqueous medium that is present when the microbial polysaccharide is produced.

The product and process of Blaney et al. differ from the present product and process discovered by the present inventors. The present inventors have determined a method of preparing implantable microbial cellulose by partially dehydrating the microbial-derived cellulose using a temperature induced removal of liquid that can be implanted without drying or that can use solvents like supercritical carbon dioxide to achieve a dry implantable material. Both materials would undergo sterilization either in the wet or dry form depending on the desired product. The product of Blaney et al. also differs from the present product in that the present product is capable of in vivo implantation as a result of non-pyrogenicity (non-endotoxicity), enhanced tensile strength and suture retention, sterilization by gamma irradiation, and biocompatibility.

A product that is similar to the material described in the present invention is the material in U.S. Pat. No. 6,599,518 Solvent Dehydrated Microbially-Derived Cellulose for Implantation. That invention describes a solvent dehydration using methanol, acetone, or other organic solvent to a water content of under 15%. The present invention differs from that material in that there is considerable more liquid remaining in the pad following dehydration so that it does not have to be rehydrated to improve its conformability as is necessary for the solvent dehydrated material. The present invention in its supercritical $CO_2$-dried form also differs from the solvent dehydrated by being more absorptive.

While solvent dehydration results in a fully dried implantable material, prior to the present invention there has not been an acceptable partially dehydrated implantable material comprising microbial-derived cellulose. Accordingly, there remains a need for a partially dehydrated implantable material comprising microbial derived cellulose that can be used for a wide variety of medical and surgical applications. Methods of implanting microbial-derived cellulose for a variety of applications are also particularly desirable.

OBJECTIVES OF THE INVENTION

An object of the present invention is to provide microbial-derived implantable cellulose, wherein the material is capable of in vivo implantation, and the method for producing the same. The material can be used as a tissue substitute, bulking agent and a surgical mesh. Another object of the invention is to provide microbial-derived implantable cellulose, wherein the material is capable of in vivo implantation that has desirable mechanical properties such as tensile strength, elongation and sutureability. Still another object of the invention is to provide microbial derived cellulose that is non-pyrogenic and biocompatible and is capable of being sterilized. Yet another object of the invention is to provide microbial-derived cellulose that is conformable and can absorb fluid. These and other objectives will readily become apparent to those skilled in the art in view of the teachings hereinafter set forth.

SUMMARY OF THE INVENTION

Figure 1:
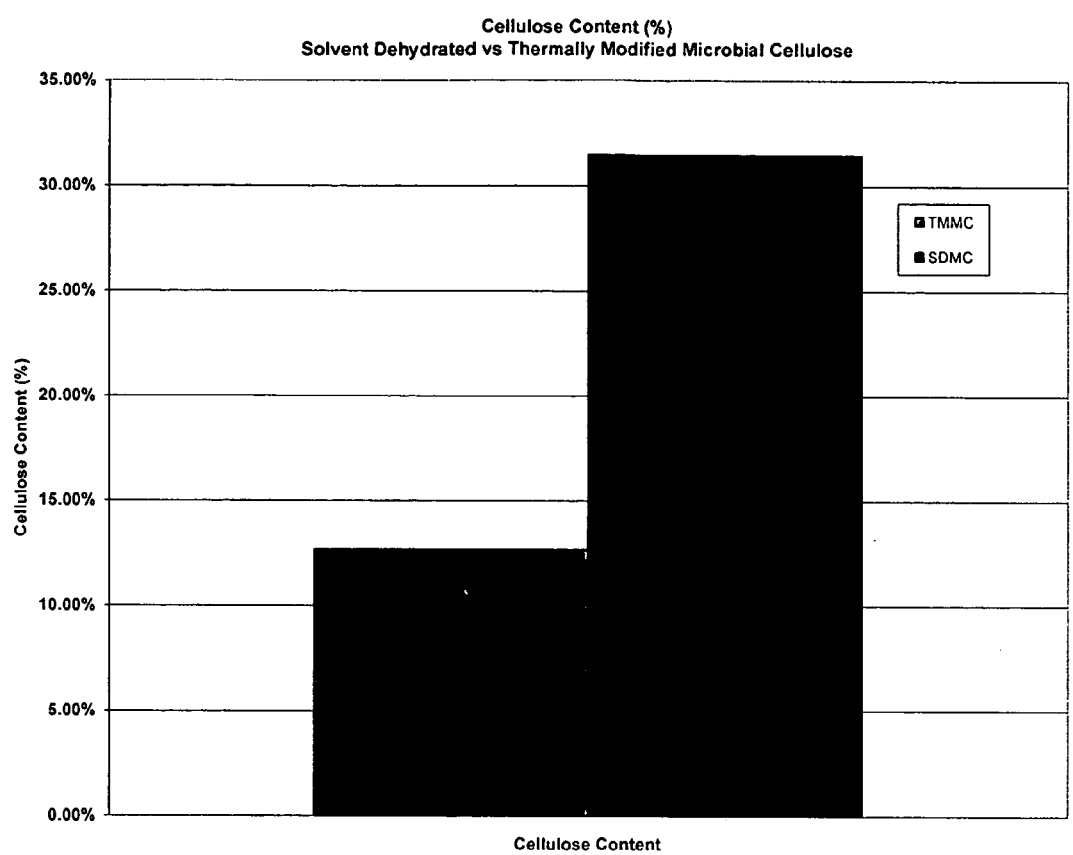
FIG. 1 shows the difference in cellulose content of thermally modified microbial-derived cellulose (TMMC) compared to solvent dehydrated microbial cellulose (SDMC).

The materials of the present invention comprise an implantable form of thermally modified microbial-derived cellulose, particularly cellulose produced from cultures of *Acetobacter xylinum* propagated in a nutrient media and incubated under controlled conditions. The cellulose film or pellicle is produced via *A. xylinum* propagation inclusive of incubation under controlled conditions. The pellicle is chemically treated with sodium hydroxide to destroy pyrogens and viable microorganisms then rinsed with filtered water. Following compression of each pellicle, the material is placed in a closed container and the temperature decreased to below 0° C. After a period of time, the temperature is increased to above 0° C. and excess moisture that is released is removed. The preferred embodiment is then cut, packaged, and gamma sterilized. Another embodiment is further processed by exchanging the water for methanol, exchanging the methanol for supercritical carbon dioxide, and finally removing the $CO_2$ to obtain a dry form of the product. This product is then cut, packaged and either gamma or ethylene oxide sterilized.

In one aspect of the invention, a method is provided for producing both hydrated and dry thermally modified cellulose from microbial derived cellulose. The method comprises the steps of propagating cellulose-producing microbes in a nutrient media under controlled conditions followed by chemically treating the microbial-derived cellulose with sodium hydroxide to depyrogenate the material and destroy viable organisms prior to further processing.

In another aspect of the invention, the cellulose is dehydrated (water is removed) by first placing it in a closed container and decreasing the temperature to below 0° C. After a period of time, the temperature is increased to above 0° C. and excess moisture that is released is removed.

In a further embodiment of the invention, this material can be processed using supercritical carbon dioxide technology to dry the material.

In a further embodiment of the invention the thermally modified microbial-derived cellulose is used as an implantable medical material for plastic surgery, general surgery, and neurosurgery. The thermally modified microbial-derived cellulose is useful in various surgical procedures, because it can be cut into desirable sizes and shapes to meet surgical requirements and is conformable so that it can mold to various surfaces without adhering.

A further aspect of the invention relates to a kit comprising microbial-derived cellulose and a package comprising a sealed waterproof pouch, optionally placed within a secondary waterproof pouch, and gamma sterilized or ethylene oxide sterilized if dry.

DETAILED DESCRIPTION OF THE INVENTION

Unless otherwise specified, "a" or "an" means "one or more". In preparing the thermally modified microbial-derived cellulose of the present invention, the cellulose was synthesized by bacteria, preferably the bacteria *Acetobacter xylinum* (wild type), and was recovered from inoculation flasks and propagated via continued inoculation and incubation for linear growth in subsequent flasks and tanks of optimized media to attain the desired volume of microbial derived cellulose. The media is comprised of nutrients such as sucrose, ammonium sulfate, sodium phosphate, magnesium sulfate, citric acid, acetic acid and trace elements resulting in a growth media having an acidic pH. The sterilized media is inoculated from propagation cultures of *A. xylinum* and filled into bioreactor trays at the appropriate volume to yield a final ratio of cellulose to water of about 1:20 to about 1:100. The bioreactor trays are sealed and incubated in a controlled environment at 30° C.±2° until growth of a pellicle of microbial-derived cellulose is complete. The pellicles are removed from the bioreactor trays and are chemically treated to remove bacterial by-products and residual media. A caustic solution, preferably sodium hydroxide at a preferable concentration of about 0.1M to 4M, is used to remove viable organisms and pyrogens (endotoxins) produced by bacteria from the pellicle. The treated pellicles are then rinsed with filtered water to reduce microbial contamination (bioburden).

The pellicles are then compressed to the desired thickness. The original fill volume and the compression steps are integral to the present invention to attain the desired density that affects the strength, integrity, and function of the cellulose. Further processing of the present invention continues with placing the cellulose in a closed container and decreasing the temperature to below 0° C. After a period of time, the temperature is increased to above 0° C. and excess moisture that is released is removed to partially dehydrate the cellulose. Without being bound to any one theory, it is believed that at below 0° C., water crystals form and are brought to the surface of the cellulose mesh. At temperatures above 0° C. the liquid that has been removed is not allowed to rehydrate the surgical mesh, thereby yielding a product having increased tensile strength, elongation (stretch), conformability and suture retention when used as an implantable medical device for various surgical procedures. Depending on the desired level of dehydration, the films are exposed to one or more temperature variation cycles. The excess liquid is removed by pouring, dabbing or vacuuming it off. Partially dehydrated samples are tested for cellulose content and absorption capability.

The partially-dehydrated samples may be further processed by exchanging the liquid (water) in the sample with methanol. The methanol soaked samples are then placed into the supercritical fluid extractor and the methanol exchanged with carbon dioxide in the supercritical state. Once the exchange takes place and the temperature is raised, the $CO_2$ is removed and the sample appears as a dried cellulose pad.

In a controlled environment, the wet or dry films can be cut to various shapes and sizes that those skilled in the art will understand. It is possible for each unit to be packaged in a waterproof single- or double-pouch system and sterilized by exposure to gamma irradiation at a dose level as high as 35 kGy, but preferably a lower dose would be used. The gamma dose is determined by the bioburden level of the non-sterile material as described in ISO 11137 Sterilization of Health Care Products—Requirements for validation and routine control—Radiation Sterilization.

The waterproof packaging is comprised of waterproof inner and outer chevron peelable pouches. The material may be a polyester/LDPE/foil blend sealed to silica coated polyester, suitable for sterilization, by example gamma irradiation.

The inventive microbial-derived cellulose can be used in tissue augmentation or repair that involves implantation of the subject microbial-derived cellulose material for general surgery, plastic surgery and neurosurgery applications. Examples of surgical uses include but are not limited to, general soft tissue augmentation, pelvic floor reconstruction, bladder neck suspension, hernia repair, inguinal hernia patch and duraplasty.

Another use of the present invention cellulose material involves their ability to be sutured in place. Suture retention is critical for implantable medical articles to secure and maintain position during surgery, healing and function. The surgeon must rely on the ability of the implantable material to not only accept suture without tearing during needle insertion, but to also retain the suture without tearing away from the sutured edge of the implant.

The ability of the present inventive microbial-derived cellulose to be used in surgical procedures requires that the material is safe and effective for its intended purpose and achieves sufficient biocompatibility.

The ability of the present invention to withstand depyrogenation and sterilization processes is necessary toward producing an implantable medical device for general, plastic and neurosurgery. Often, biomedical polymers have lower thermal and chemical stability than other materials such as metals, ceramics and synthetics; therefore, they are more difficult to sterilize using conventional methods. For any material used as an implantable medical device, it must be free from endotoxins (non-pyrogenic), microorganisms and other possible contaminants that will interfere with the healing process and cause harm to the recipient.

The present invention undergoes depyrogenation by using a heated caustic solution known to destroy endotoxins that may be present due to bacteria or cross-contamination from materials exposed to pyrogens. The material is then gamma irradiated at doses sufficient to destroy microorganism contamination by pre-determined sterility assurance levels based on bioburden levels (the amount of microorganisms typically present on the non-sterile material.) Samples were gamma irradiated at a dose of about 35 kGy. It can be concluded that the material can be depyrogenated with a strong alkaline sodium hydroxide solution at an elevated temperature and that it can withstand gamma sterilization without any significant affect to mechanical properties. Also the dry form may undergo either gamma irradiation or ethylene oxide sterilization.

Medical devices intended for implant must meet various criteria to comply with either the U.S. Food and Drug Administration (FDA) regulations or the International Organization for Standardization (ISO) requirements in order to be deemed fit for their intended use. Cytotoxicity studies are considered relevant to prove that the implant device is safe/biocompatible with human tissue. In vitro biocompatibility studies, based on the International Organization for Standardization 10993: Biological Evaluation of Medical Devices, Part 5: Tests for Cytotoxicity: in vitro Methods Guidelines were conducted on the present invention to determine the potential for cytotoxicity.

The mechanical properties of the microbial-derived cellulose relates to tensile strength, % elongation and suture retention. The material is considered multidirectional as well as possessing the properties of a linear polymer whereas the polymer chains tend to line up in the direction of draw; therefore no regard was made for the direction of the cutting.

The following examples are given to illustrate the present invention. It should be understood, however, that the invention is not to be limited to the specific conditions or details described in these examples. Throughout the specification, any and all references are specifically incorporated into this patent application by reference.

EXAMPLE 1

Manufacture of Implantable Microbial-Derived Cellulose

This example is directed to a preparation of standard thermally modified microbial-derived cellulose films produced by *A. xylinum* within a controlled environment to minimize bioburden (microorganism contamination.) From a propagation vessel, sterilized media was inoculated with *A. xylinum*, filled into bioreactor trays at a volume of about 110 g, and incubated until optimal growth of the pellicle was observed. The pellicles were extracted from the trays and then underwent chemical processing (depyrogenation) in a tank of caustic solution that was heated for about one hour. The pellicles then underwent a continuous rinse with filtered water. The films were compressed within a pneumatic press to yield a pellicle having the desired weight and cellulose content.

The pressed films subsequently were placed in a closed container and the temperature decreased and held below 0° C. for varying periods of 2 to 10 days. The film was then brought to ambient temperature and excess water discarded. The average cellulose content for this batch was 6.47%. Subsequent batches, processed as described in this example, were tested for cellulose content. The cellulose content ranged from 5.2% to 18.4% with an overall average of 12.7%. Each sample unit was placed in a pouch, sealed and used for various mechanical tests. FIG. 1 presents a comparison to solvent dehydrated microbial cellulose.

EXAMPLE 2

Manufacture of Thermally Modified Microbial-Derived Films of Varying Thicknesses Various thicknesses of thermally modified microbial-derived cellulose films were produced by *A. xylinum* were prepared generally according to the procedure of Example 1.

From a propagation vessel, sterilized media was inoculated with *A. xylinum*, filled into bioreactor trays at different volumes and incubated until optimal growth of the pellicle was observed. The pellicles were extracted from the trays and then underwent chemical processing (depyrogenation) in a tank of sodium hydroxide (depending on the initial fill weight) which was heated for about one hour. The pellicles then underwent a continuous rinse with filtered water. The films were compressed with a pneumatic press to yield a pellicle with the desired weight and cellulose content.

The pressed films subsequently were placed in a closed container and the temperature decreased and held below 0° C. for varying periods of 2 to 10 days. The film was then brought to ambient temperature and excess water discarded.

Some of the pressed films were further processed using supercritical $CO_2$ as follows. Materials were placed into 100% methanol for 2-7 days with daily changes of fresh methanol. The material was then wrapped in a polypropylene mesh and placed into the supercritical fluid exchange system. Using a $CO_2$ pressure of about 2000 psi, the exchange was run for about three hours. The sample was removed in the dry form. All testing on the dry material was performed after minimal hydration.

EXAMPLE 3

Mechanical Properties of Thermally Modified Microbial-Derived Cellulose Films A. Testing of Mechanical Properties of Microbial-Derived Cellulose Mechanical tests of the subject thermally modified microbial-derived cellulose were performed to determine the tensile strength, elongation, and suture retention (pull-out) as applicable for an implantable medical material. Samples from the present invention were cut into either 1 cm×4 cm strips or 1 cm×8 cm strips for testing, using surgical scissors and a template. For example, each strip was not cut from an area parallel to the edge of the film, but strips were cut from various directions within the film to represent the overall area within each film. The thickness was measured using electronic calipers in millimeters, accurate to ±0.03 mm.

The mechanical properties of the thermally modified microbial-derived cellulose were determined using a tensile machine (United Calibration Corporation) Model SSTM-2kN with a load versus crosshead distance traveled setup. The 500 lb. load cell was calibrated. The gauge length of the specimen was recorded before the start of each test. The gauge length is the length of the specimen between each grip (determined as 25 mm for each 40 mm strip and 60 mm for each strip with sutures attached.) The top grip was textured and mounted to assure alignment with the bottom grip. The bottom grip was textured, secured to the machine base to avoid motion during each pull cycle. Pneumatic grips were used to tighten the sample within the clamps of each grip. Each sample was presented before testing to ensure that the sample was straight and the load was zero. The preload of 1N was applied at a rate of 5 mm/minute and testing performed at the crosshead speed set at 300 mm/minute.

Each sample was tested in its natural form. For tensile strength and elongation testing, each 1 cm×4 cm sample was centrally positioned in the top clamp of the testing machine so that the long dimension was parallel to the direction of the force application. The top grip was tightened and the bottom of the sample was positioned in the bottom clamp and tightened. For suture retention, each 1 cm×8 cm sample was prepared by folding the strip in half and inserting a suture into the folded "double thickness" end of the test sample, 2-4 mm from the end [FIG. 4]. Ethicon 2-0 Prolene Suture was used with a taper SH needle. The top grip was tightened to equally distribute the holding pressure along the surface. The suture was carefully inserted between the clamps of the lower grip, parallel to the direction of the force application, and tightened. A guideline was followed whereas if a sample slipped in the clamps, or broke at the edge of or in the clamps, or if the sample broke and the suture was not torn from the sample, the result was discarded and the test repeated pending availability of material.

Samples were tested at a constant rate of 300 mm/minute until the sample broke or until the suture material tore through the sample. The ultimate tensile strength (stress at failure) and percent elongation (maximum strain) were calculated from the stress-strain curves generated by the tensile machine software.

B. Results of Tensile Strength and % Elongation Tests

Figure 2:
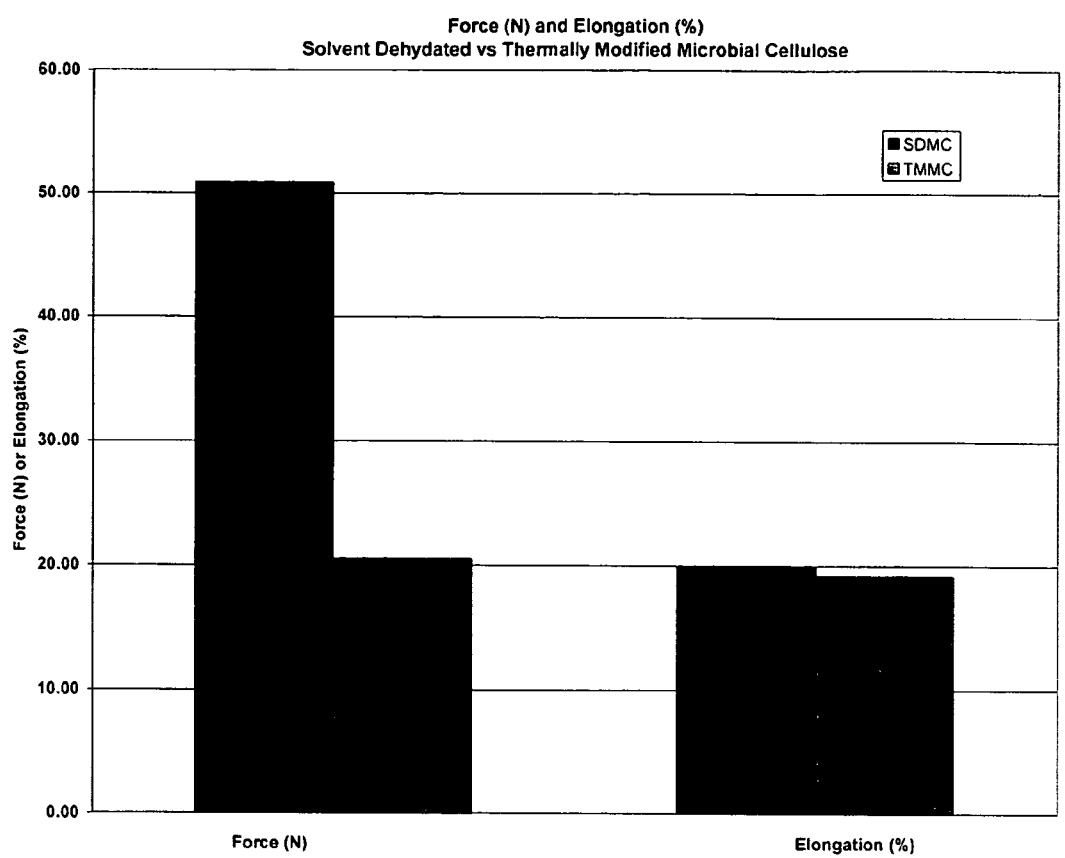
FIG. 2 shows mechanical strength (Force (N)) and elongation (%) of the thermally modified microbial-derived cellulose (TMMC) compared to solvent dehydrated microbial cellulose (SDMC) that has been rehydrated.
Figure 3:
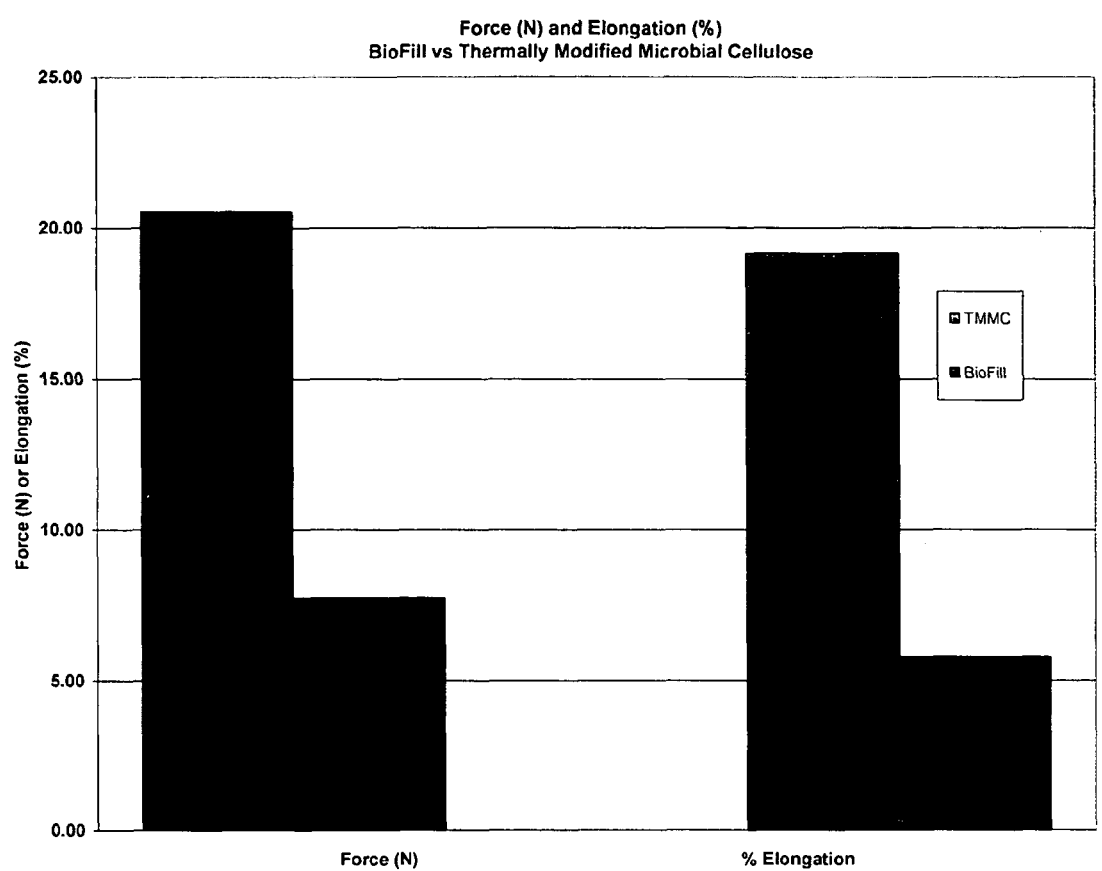
FIG. 3 shows mechanical strength (Force (N)) and elongation percent of the thermally modified microbial-derived cellulose compared to stretched, air-dried cellulose (BIOFILL™).

The average tensile strength and the % elongation of thermally modified microbial cellulose samples are shown in FIGS. 2 and 3.

Table 1 shows an average of the Peak Load (Newtons). The % Elongation was calculated as the maximum strain versus stress from each respective stress-strain curve. All results were valid.

TABLE 1

| Thermally Modified Microbial-Derived Cellulose | |
|---|---|
| Peak Load (N) | Peak Elongation % |
| 20.5 ± 8.5 | 19.2 ± 5.9 |

Tensile strength ranged from 10.4 to 53.4 Newtons, falling within the 50% discard guideline for determination of consistent, reliable results when testing a biological material. The % Elongation ranged from 9.3% to 40.0%. These values indicate an optimal degree of stretch when the implantable material is used to support or retain soft tissue repair during general and plastic surgery. Thermally modified microbial-derived cellulose presents the higher strain to fracture and the lower elastic modulus when compared to solvent dehydrated microbial-derived cellulose.

C. Results of Suture Retention Tests

Figure 4:
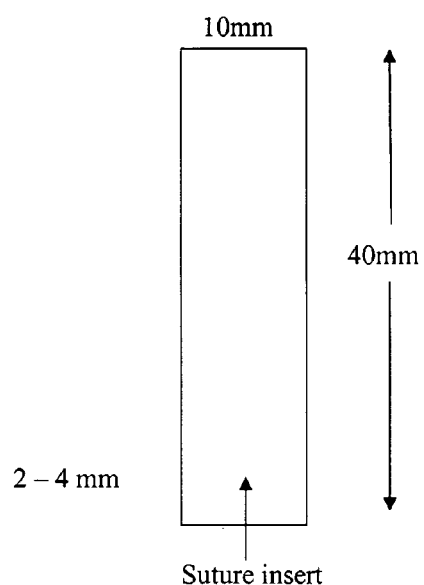
FIG. 4 is a schematic for the suture testing set-up for the various materials.

Instructions for suturing commercial implantable products typically require suturing no less than 2-4 mm from the edge of the product to the soft tissue at the surgical site; therefore all samples were tested by inserting the suture 2-4 mm from the bottom edge (FIG. 4). It is necessary to examine suture pull-out data when comparing to other materials and commercial products to determine fundamental performance.

Figure 5:
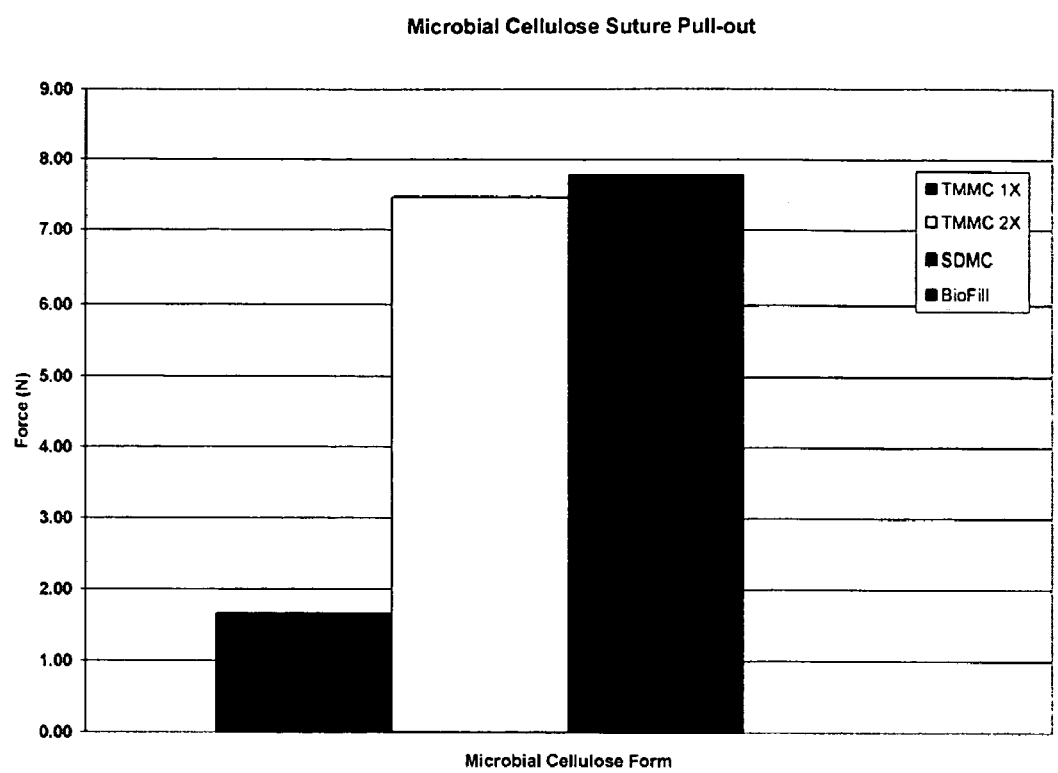
FIG. 5 shows suture retention of thermally modified microbial-derived cellulose compared to solvent dehydrated (SDMC) and air-dried cellulose (BIOFILL™). [Biofill had no suture strength, F=0]

The average results of Peak Load (Newtons) for the TMMC folded material was 7.47N+/−1.18. The average results of Peak Load (Newtons) for the TMMC non-folded material was 1.66N±0.64. FIG. 5. All results were valid.

EXAMPLE 4

Comparison of Mechanical Properties of the Thermally Modified Microbial-Derived Cellulose to Solvent Dehydrated Microbial-Derived Cellulose and Commercial Products A general mechanical strength analysis of various microbial derived cellulose materials was performed for demonstration of various degrees of tensile strength, % elongation and suture retention. Table 2 and FIGS. 2, 3 and 5 show the comparison of Thermally Modified Microbial-Derived Cellulose (TMMC) to solvent dehydrated microbial cellulose (SDMC) and to air-dried, stretched microbial derived cellulose BIOFILL™ (BioFill Productos Biotechnologicos, Curritiba, Parana, Brazil.) BIOFILL™ was cut into 1×4 cm strips and underwent testing as in Example 3. BIOFILL™ is synthesized from *A. xylinum* and is processed to a film that is air-dried during stretching.

Table 2—shows results of averaged test data for Tensile Strength, % Elongation and Suture Pull-out for Thermally Modified Microbial Cellulose, Solvent Dehydrated Microbial Cellulose and BIOFILL™ cellulose. TMMC demonstrated lower tensile strength (N) compared to SDMC (−59%), equivalent tensile strength compared to wet microbial cellulose and superior tensile strength compared to air-dried BIOFILL™ (+165%). Tensile strength is important during surgical handling, insertion, the healing process, and implant function.

Thermally Modified Microbial Cellulose demonstrated equivalent % Elongation when compared to the SDMC. This indicates that the thermally modified microbial cellulose has limited "stretch" and conformability, a desirable characteristic when implant indications are for duraplasty, etc.

TABLE 2

| | TMMC | SDMC | BIOFILL ™ |
|---|---|---|---|
| Tensile Strength (N) | 20.54 | 50.89 | 7.74 |
| % Elongation | 19.15 | 19.93 | 5.77 |
| Suture Pull-Out (N) (non-folded) | 1.75 | N/A | N/A* |
| Suture Pull-out (N) (folded) | 7.47 | 7.78 | N/A* |

*BIOFILL material did not hold suture, tore during 1 N pre-load (0.2 N)

As shown in FIG. 2 TMMC has lower tensile strength but is equivalent to % elongation of SDMC.

Further, as shown in FIGS. 3 and 5, TMMC is superior to air-dried cellulose (BIOFILL™).

The air-dried cellulose (BIOFILL™) had minimal extensibility and was extremely difficult to handle during mechanical testing. After rehydration, the air-dried cellulose (BIOFILL™) became transparent, difficult to handle due to rolling and puckering during insertion into the grip clamps, and several pieces broke prior to the pulling process due to immediate drying during ambient working conditions.

With respect to suture pullout, FIG. 5 presents the results of suture retention. It is important to note that that the air-dried cellulose (BIOFILL™) is not present because of the inability of the BIOFILL™ material to accept a suture. The TMMC and SDMC were similarly capable of holding sutures during the testing process.

The present inventive cellulose material as well as the solvent dehydrated cellulose and air-dried cellulose (BIOFILL™) were derived from *Acetobacter xylinum*. The results show clear differences in the mechanical properties between the materials that were produced by different processes. It is believed that the difference in mechanical properties is due to the preparation process of the present inventive microbial-derived cellulose. Thermal modification of cellulose films allows for control of the resulting film properties, especially conformability, and therefore, it is expected that the present invention is capable of performing as an implantable material with better results than previous implantation materials, especially in dural applications.

EXAMPLE 5

Swelling Comparison

A desirable feature for certain implant materials (i.e. dura substitutes) is to allow some increase in thickness through absorption of surrounding fluid that reaches a maximum and then maintains its shape. A study was conducted to demonstrate changes in thickness of various materials over time when submerged in isotonic saline.

Figure 6:
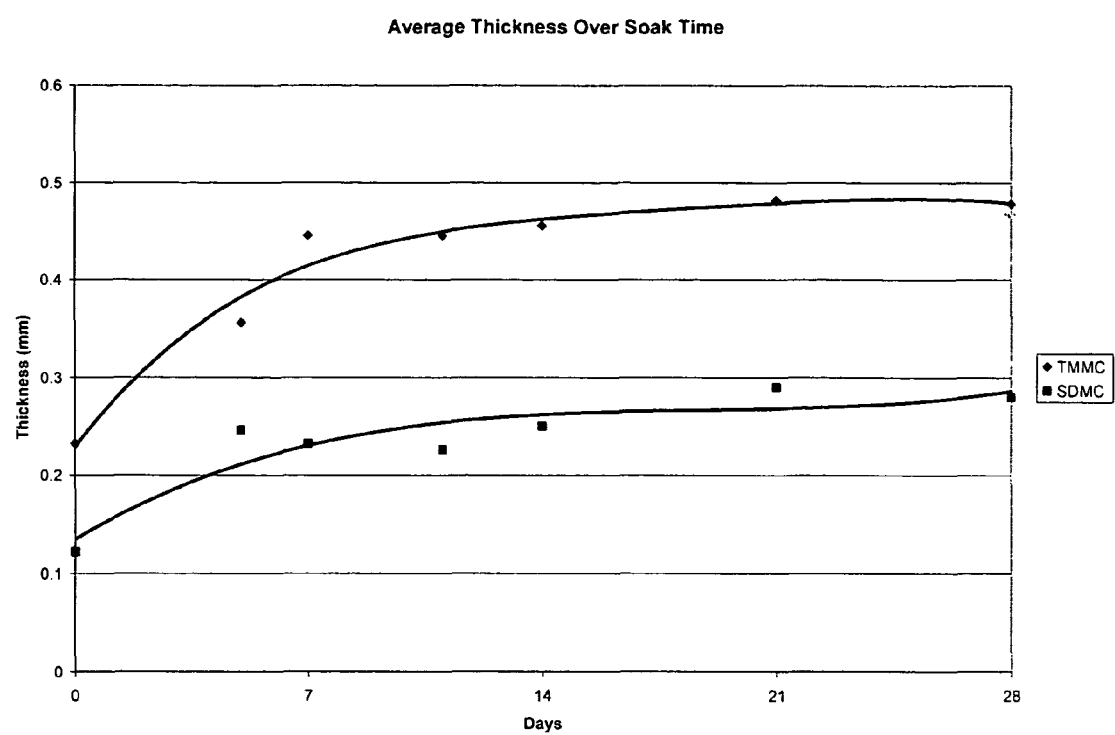
FIG. 6 shows increase in thickness of thermally modified microbial-derived cellulose (TMMC) compared to solvent dehydrated microbial cellulose (SDMC) after submersion in saline for various times.

Samples of Thermally Modified Microbial Cellulose and Solvent Dehydrated Microbial Cellulose were measured for initial thickness using a caliper with an error of 0.03 mm. The materials were then submerged in saline and measured at varying times to 28 days. The graph in FIG. 6 demonstrates that materials increased in thickness initially and then leveled off. TMMC demonstrated an increase of approximately 0.25 mm while the SDMC only increased by 0.16 mm.

By absorbing some fluid, TMMC demonstrated the possibility to soak up excess fluid, while not becoming overly thick.

EXAMPLE 6

Biocompatibility Testing

Implantable materials must be biocompatible. Testing to demonstrate this follows the International Standards Organization (ISO) 10993 documentation. Depending on the application specific testing is required. Microbial cellulose has been examined using the tests in Table 3.

TABLE 3

Biocompatibility testing of Microbial Cellulose

| Test | Cellulose | Results |
| --- | --- | --- |
| Irritation | X | Pass |
| Systemic Toxicity | X | Pass |
| Cytotoxicity | X | Pass |
| Genotoxicity | X | Pass |
| Sensitization | X | Pass |
| In Vitro Hemolysis | X | Pass |
| Subchronic Toxicity | X | Pass |
| 26 Week Muscle Implant Study | X | Pass |
| Chronic Toxicity | X | Pass |
| Pyrogen Testing | X | Pass |

It will be apparent to those skilled in the art that various modifications and variations can be made in the methods and compositions of the present invention without departing from the spirit or scope of the invention. Thus, it is intended that the present invention cover the modifications and variations of this invention provided they come within the scope of the appended claims and their equivalents. All patents, publications and references cited herein are expressly incorporated herein by reference in their entireties to the same extent as if individually incorporated by reference.

We claim:

1. A method for preparing an implantable or topical material for general surgery or plastic surgery comprising:
   providing a microbial cellulose;
   treating said microbial cellulose to render said cellulose non-pyrogenic;
   partially dehydrating said microbial cellulose by exposing it to temperatures below 0° C., then exposing said microbial cellulose to temperatures above 0° C.; and
   subsequently discarding liquid that was removed,
wherein the general surgery comprises general soft tissue augmentation, pelvic floor reconstruction, bladder neck suspension, hernia repair, or inguinal hernia patch.

2. A method for preparing an implantable or topical material for general surgery or plastic surgery comprising:
   providing a microbial cellulose;
   treating said microbial cellulose to render said cellulose non-pyrogenic;
   partially dehydrating said microbial cellulose by exposing it to temperatures below 0° C., then exposing said microbial cellulose to temperatures above 0° C.; and
   subsequently discarding liquid that was removed,
wherein a percentage elongation of the material ranges between 9.3% and 13.3%.

3. A method for implanting an implantable material during a general surgery or a plastic surgery into a subject in need thereof, comprising implanting the material into the subject, wherein the material is prepared by a method comprising:
   providing a microbial cellulose;
   treating said microbial cellulose to render said cellulose non-pyrogenic;
   partially dehydrating said microbial cellulose by exposing it to temperatures below 0° C., then exposing said microbial cellulose to temperatures above 0° C.; and
   subsequently discarding liquid that was removed.

4. The method of claim 3, wherein the general surgery comprises general soft tissue augmentation, pelvic floor reconstruction, bladder neck suspension, hernia repair, or inguinal hernia patch.

5. The method of claim 3, wherein a percentage elongation of the material ranges between 9.3% and 13.3%.

6. The method of claim 3, wherein the material is conformable.

* * * * *

UNITED STATES PATENT AND TRADEMARK OFFICE
CERTIFICATE OF CORRECTION

PATENT NO. : 8,198,261 B2
APPLICATION NO. : 10/920297
DATED : June 12, 2012
INVENTOR(S) : Damien et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1173 days.

Signed and Sealed this
Twenty-seventh Day of November, 2012

David J. Kappos
*Director of the United States Patent and Trademark Office*